Figure 1:
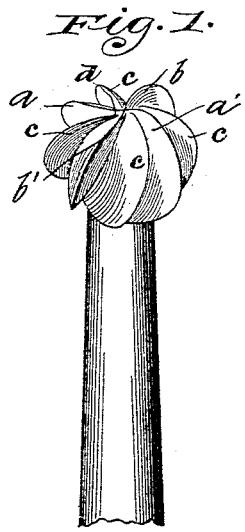

(No Model.)

J. D. WILKENS.
DENTAL BURR.

No. 533,573. Patented Feb. 5, 1895.

Witnesses,
D. S. Mann
N. M. Bond

Inventor,
John D. Wilkens
By Offield, Towle & Linthicum
Attys

UNITED STATES PATENT OFFICE.

JOHN D. WILKENS, OF CHICAGO, ILLINOIS, ASSIGNOR TO JOHN N. CROUSE, OF SAME PLACE.

DENTAL BURR.

SPECIFICATION forming part of Letters Patent No. 533,573, dated February 5, 1895.

Application filed January 13, 1894. Serial No. 496,729. (No model.)

*To all whom it may concern:*

Be it known that I, JOHN D. WILKENS, of Chicago, Illinois, have invented certain new and useful Improvements in Dental Burrs, of which the following is a specification.

This invention relates to a dental burr so constructed as to provide at its apex suitable cutting edges, preferably continuous with the cutting edges of the leaves or teeth extending over the sides or body of the head of the tool, and alternating with teeth whose cutting edges terminate short of the apex. In the most common construction of these tools, there has been provided a series of cutting blades whose cutting edges are arranged in spiral lines converging to the axis of rotation of the tool and forming whirls circumferentially of the head. These cutting blades usually terminate at the extremity of the head at a point coincident with the axis of rotation, and usually a channel or groove has been cut across the point of the tool at right angles to its axis of rotation. This construction is objectionable for that the chips or tooth matter accumulate in such channel or depression and thus clog the tool, create friction and impede and render more painful the operation. To remedy this defect it has been proposed to provide a burr-drill, as the inventor calls it, having a single continuous cutting edge crossing the axis of rotation of the tool, the theory of the inventor being that the presence of this cutting edge would adapt the tool for use both as a drill and as a burr, and render it equally adapted for cutting in the line of its axis as at right angles thereto. There are certain advantages and disadvantages incident to both of these earlier forms of construction. In the first described construction, *i. e.*, where the cutting blades or leaves all terminate near the axial center, there is no effective cutting edge at such point, and therefore the channel is usually cut to provide a clearance, and the burr or drill clogs as before described. On the other hand, this construction has certain advantages in that the cutting edge is extended and is effective to a point very near the axial center of the head, so that side or lateral cutting as well as cutting in the line of the axis is facilitated.

In the construction wherein a single cutting edge has been extended across the axis of rotation of the drill, the side leaves or teeth have been grouped on opposite sides of the head with the cutting edges of each terminating at a single point at some distance from such central cutting edge. This leaves spaces between such points and the cutting edge crossing the apex of the head which are not operated upon by the side cutting leaves. It is desirable to space these cutting edges as near together as practicable with due regard to clearance of the chips and tooth matter; and my improvement consists in a burr having teeth or leaves provided with cutting edges extending across the axis of rotation of the drill and bisecting each other at said axis, and alternating or intermediate leaves having their cutting edges terminating sufficiently short of the axis to provide for suitable clearance for the material removed by cutting edges which cross the axis of the burr.

Figure 2:
Figure 3:
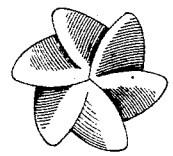

In the accompanying drawings, Figure 1 is a perspective view of an eight toothed burr, showing the stem partially broken away. Fig. 2 is an end view of the head or working end of the burr shown in Fig. 1. Fig. 3 shows a six toothed burr, and Fig. 4 a twelve toothed burr, both of which embody my invention.

In the tool shown in Figs. 1 and 2, there are eight leaves or teeth, as they are commonly called in the art, and the leaves $a$ and $a'$ are connected by a single continuous cutting edge extending across the axis of rotation of the tool. The leaves $b$ and $b'$ are similarly connected, the connecting cutting edges of the leaves $a, a'$ and $b, b'$ bisecting each other at the axis of rotation. Alternating with these are the intermediate leaves or teeth $c$ of substantially the same contour as the connected leaves or teeth, but their cutting edges terminate short of the axial center of the tool, thus providing for clearance, as indicated at $d$.

Figure 4:
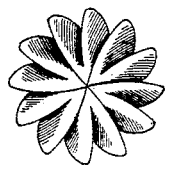

The number of leaves or teeth vary considerably. In constructing small burrs, frequently only six teeth are employed as shown in Fig. 3, and in this case, instead of having two pairs of leaves connected by continuous cutting edges intersecting each other, three of the leaves have their cutting edges extended across the end of the head while the intermediate leaves have their cutting edges terminating short of the apex. In Fig. 4 I have shown a burr having twelve teeth, six of which are connected in pairs by cutting edges crossing the apex and alternated with disconnected teeth or leaves whose cutting edges terminate short of the axis.

From the above description it will be seen that there is no "dead" point upon the working end of this tool, as in the construction where the leaves are grouped and terminate at the same point. The cutting edges which bisect each other at the axis of rotation of the tool completely traverse all of the surface not touched by the edges of the main body of the leaves, while the independent or disconnected leaves c have their cutting edges extended sufficiently near to the axis of rotation to assist materially in the cutting without liability of clogging the head of the tool with tooth matter.

It will be seen that a leaf c is interposed between each pair of the connected leaves and has an independent cutting edge, and this will be much more effective than that wherein the cutting edges all terminate at or near the axis of the drill, and also more effective than the construction wherein three or more of the side leaves are converged to a single point and with a single cutting edge only extending across the head of the drill.

I claim—

A dental burr having leaves connected by a continuous cutting edge crossing the axis of rotation of the burr and one or more leaves having a cutting edge extending to said axial center at an angle to the cutting edge of the pair and other leaves having cutting edges terminating short of the axial center arranged intermediate the connected leaves, substantially as described.

JOHN D. WILKENS.

Witnesses:
 C. C. LINTHICUM,
 N. M. BOND.